(No Model.)  5 Sheets—Sheet 1.
A. T. DAWSON & G. T. BUCKHAM.
BREECH LOADING ORDNANCE.
No. 601,129.  Patented Mar. 22, 1898.
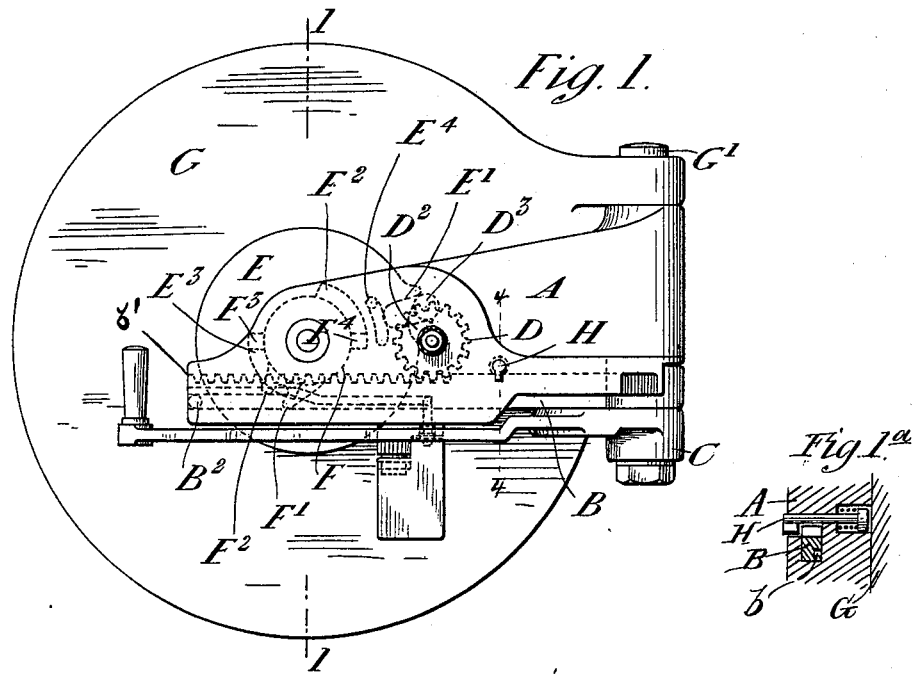
Fig. 1.
Fig. 1a.
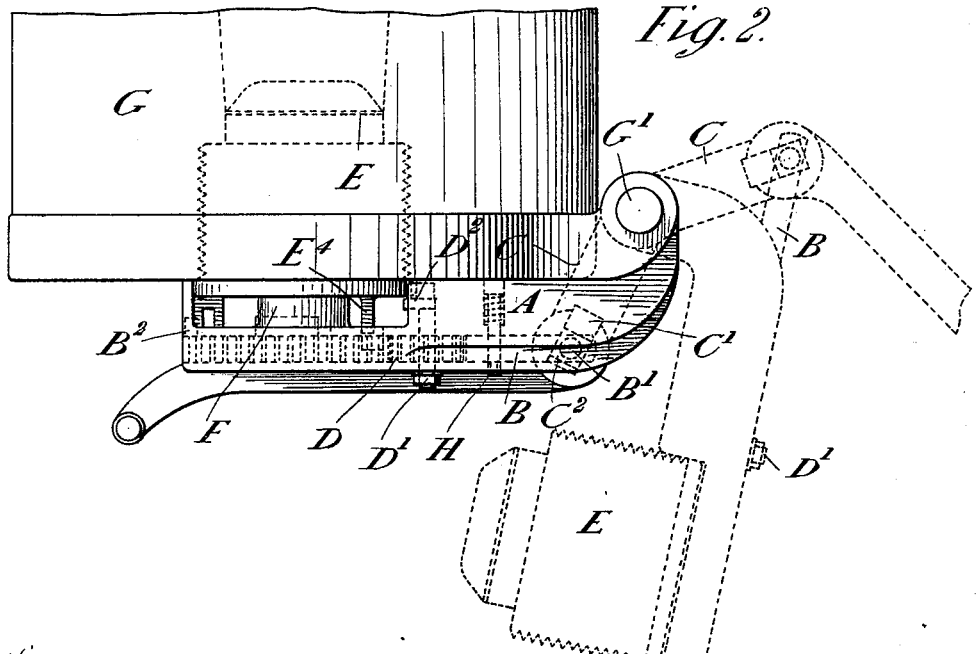
Fig. 2.
Witnesses  Inventors (No Model.) 5 Sheets—Sheet 2.
A. T. DAWSON & G. T. BUCKHAM.
BREECH LOADING ORDNANCE.
No. 601,129. Patented Mar. 22, 1898.
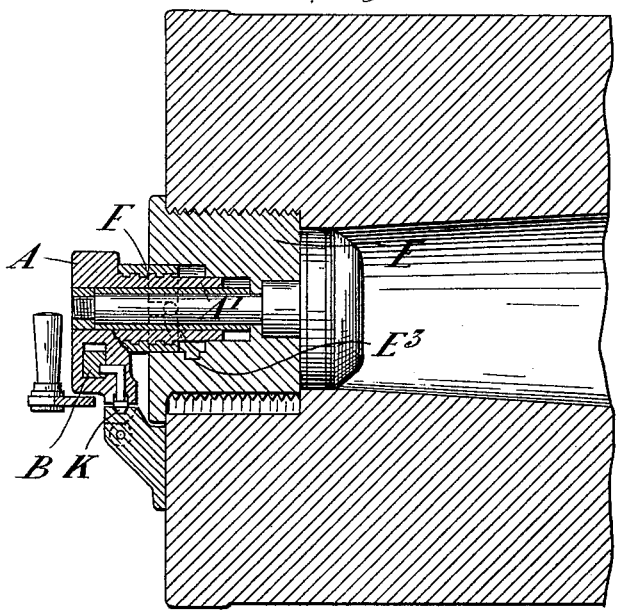
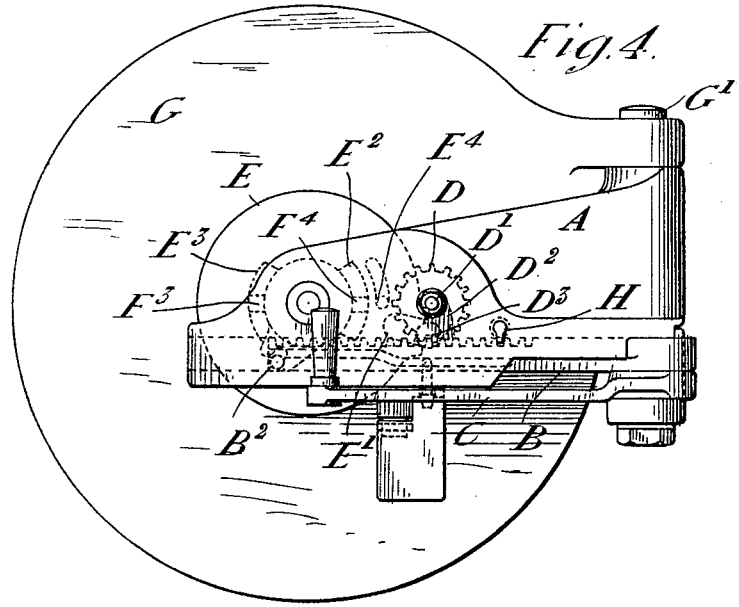

(No Model.) 5 Sheets—Sheet 3.
A. T. DAWSON & G. T. BUCKHAM.
BREECH LOADING ORDNANCE.
No. 601,129. Patented Mar. 22, 1898.
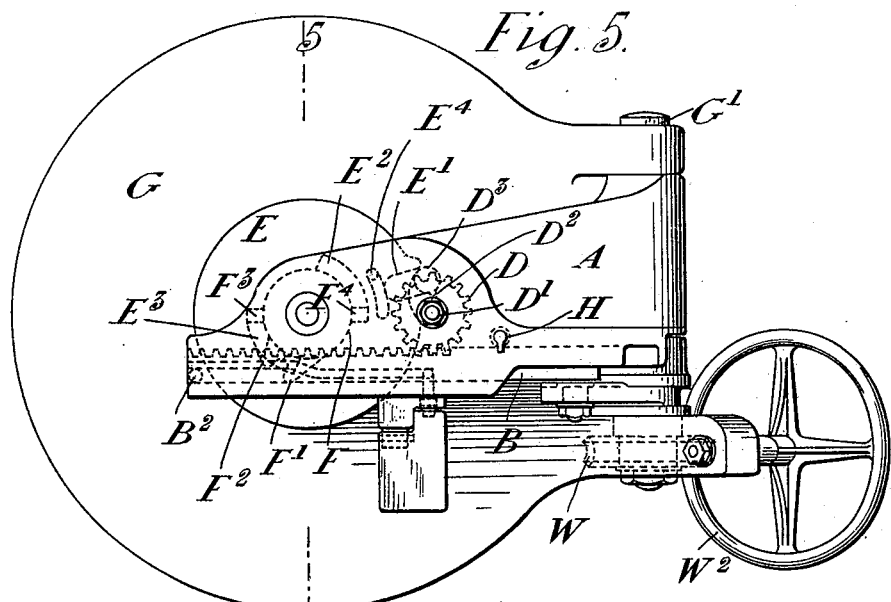
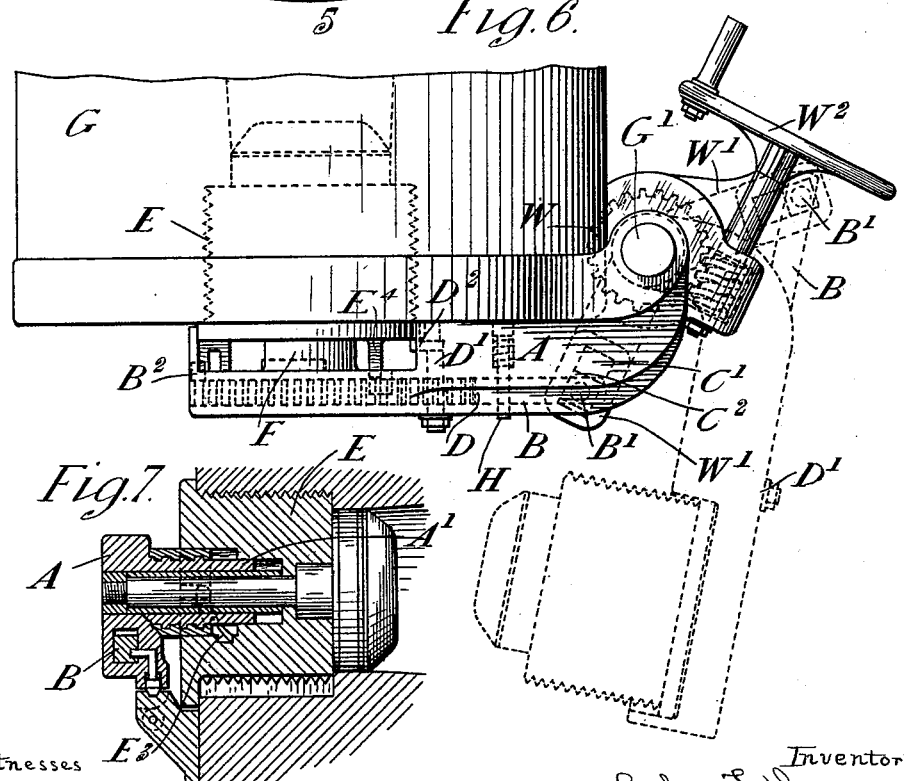

(No Model.)  5 Sheets—Sheet 4.
A. T. DAWSON & G. T. BUCKHAM.
BREECH LOADING ORDNANCE.
No. 601,129.  Patented Mar. 22, 1898.
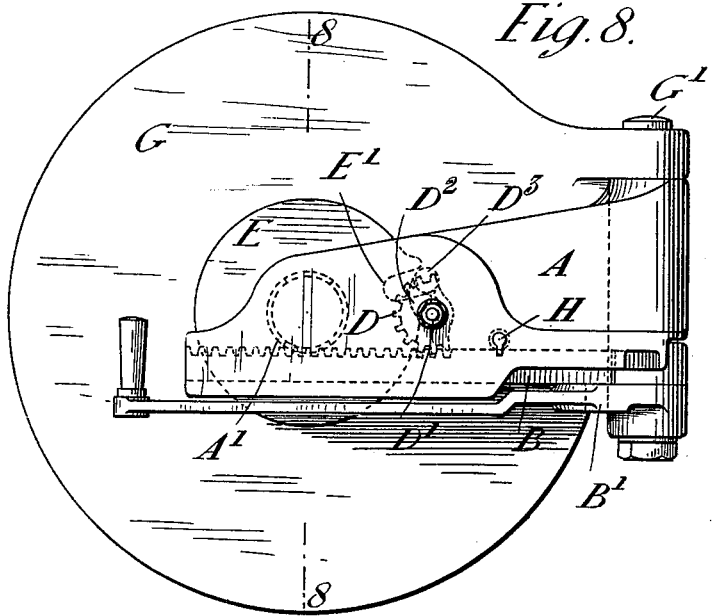
Fig. 8.
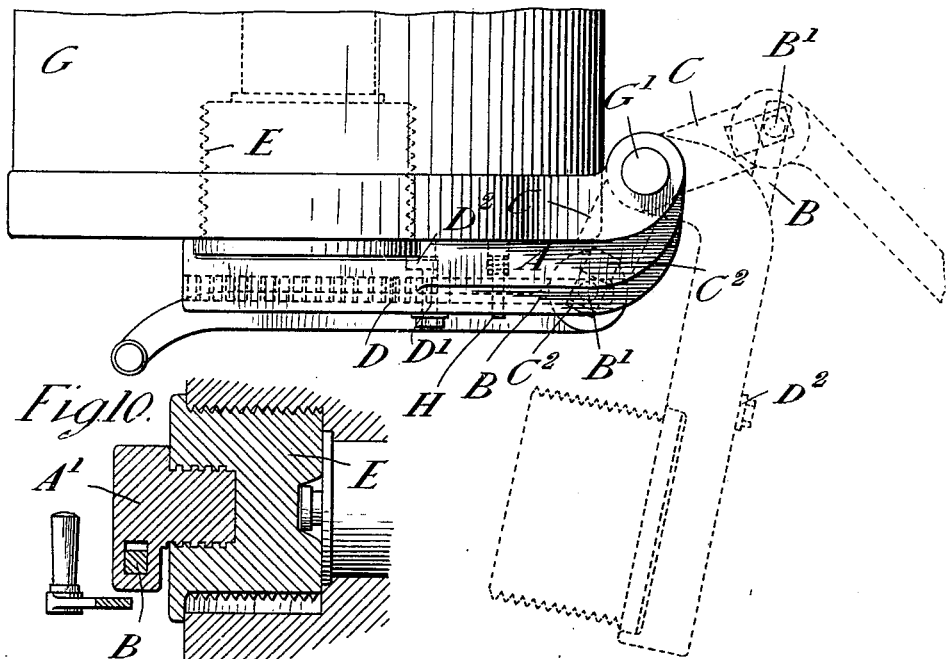
Fig. 9.
Fig. 10.

(No Model.) 5 Sheets—Sheet 5.
A. T. DAWSON & G. T. BUCKHAM.
BREECH LOADING ORDNANCE.
No. 601,129. Patented Mar. 22, 1898.
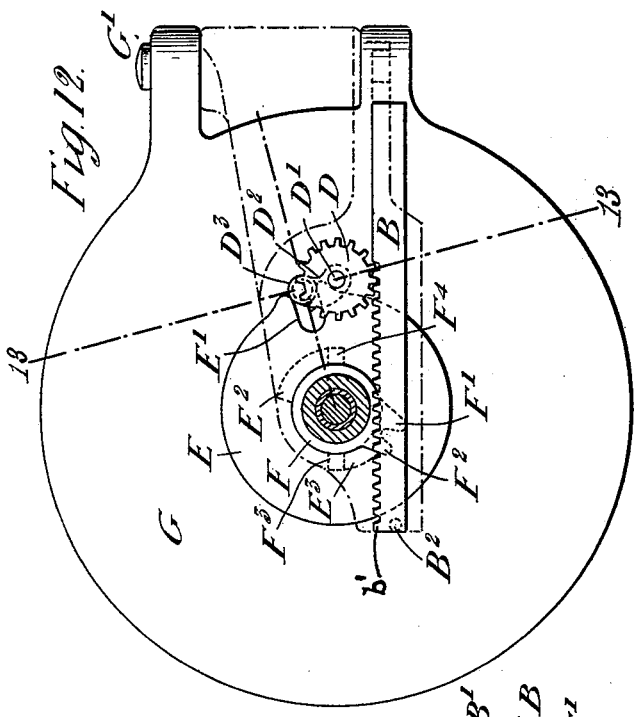
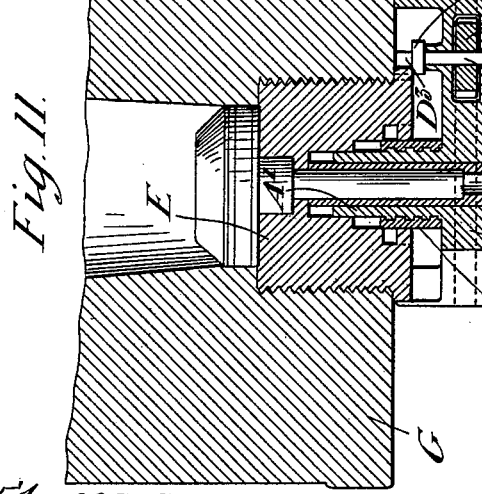
Witnesses,
Inventors,
Arthur T. Dawson,
George T. Buckham,
By James L. Norris
Atty.

UNITED STATES PATENT OFFICE.

ARTHUR TREVOR DAWSON AND GEORGE THOMAS BUCKHAM, OF SHEFFIELD, ENGLAND, ASSIGNORS TO THE VICKERS SONS & COMPANY, LIMITED, OF SAME PLACE.

BREECH-LOADING ORDNANCE.

SPECIFICATION forming part of Letters Patent No. 601,129, dated March 22, 1898.

Application filed July 29, 1897. Serial No. 646,373. (No model.)

*To all whom it may concern:*

Be it known that we, ARTHUR TREVOR DAWSON and GEORGE THOMAS BUCKHAM, citizens of England, residing at River Don Works, Sheffield, in the county of York, England, have invented certain new and useful Improvements in Breech-Loading Ordnance, of which the following is a specification.

Our invention relates to the mechanism for opening and closing the breech of a breech-loading gun, which mechanism we arrange in such a manner that a continuance of the same action which rotates and unlocks the breech-plug also gives it when necessary a slight longitudinal movement to the rear and then swings it out of the gun around the pivot, on which it is mounted.

We shall describe our invention, referring to the accompanying drawings, in the several figures of which similar letters denote corresponding parts.

Figure 1 is a rear elevation of a gun having a breech mechanism in accordance with our invention. Fig. 1$^a$ is a part section on the line 4 4 of Fig. 1. Fig. 2 is a plan with the breech-plug locked and also shown in dotted lines swung out. Fig. 3 is a section on line 1 1 of Fig. 1. Fig. 4 is a rear elevation showing the breech-plug unlocked and ready to be drawn out. Figs. 5, 6, and 7 show a modification specially adapted for large guns. Fig. 5 is a rear elevation. Fig. 6 is a plan showing the breech-plug locked and also shown in dotted lines swung out. Fig. 7 is a part section on the line 5 5 of Fig. 5. Figs. 8, 9, and 10 show a further modification adapted for a gun fitted with a cartridge-case instead of an obturator. In this modification no longitudinal rearward movement of the breech-plug is required. Fig. 8 is a rear elevation. Fig. 9 is a plan with the breech-plug locked and also shown in dotted lines swung out. Fig. 10 is a part section on line 8 8 of Fig. 8. Fig. 11 is a sectional plan view on the axial line of Fig. 1. Fig. 12 is a front view, the front of the plug-carrier being removed to show the parts behind; and Fig. 13 is a sectional view on the line 13 13 of Fig. 12.

Referring to Figs. 1, 1$^a$, 2, 3, 4, 11, 12, and 13, in the plug-carrier A is fitted a horizontally-sliding bar B, one end of which is connected by a pin B', engaged in a sliding block C$^2$, working in a slotted hole C', to a lever C, which is preferably mounted on the same pivot G' with the carrier A and which can be moved by hand in the case of a small gun or by worm-gear, as shown in Figs. 5, 6, and 7. On the top of the bar B are teeth $b'$, constituting a rack with which is geared a pinion D, which is in a recess in the carrier A and is fixed on an axis-pin D'. On the inner end of the axis-pin D' is formed or fixed a crank-arm or actuating-lever D$^2$, having a projecting stud or roller-pin D$^3$, which works in a notch E' in the rear flange of the breech-plug E for turning the plug partly around.

On a boss A', projecting inward from the carrier A, we fit a sleeve F, capable of turning on it, but prevented from moving longitudinally by screw-threads or annular collars which may be interrupted. The sleeve F has two or more studs F$^3$ and F$^4$ projecting from it and working in inclined grooves E$^3$ and E$^2$, (preferably of increasing twist,) cut in the bore of the breech-plug E, so that when the sleeve F turns on the boss A' a longitudinal movement is given to the breech-plug E after it is unlocked. The grooves may be cut on the outside of the sleeve F, the studs F$^3$ and F$^4$ projecting from the internal surface of the breech-screw. The sleeve F has a forked arm F' projecting from it, which engages with the stud B$^2$ (projecting from one end of the bar B) after the breech-plug E is unlocked, so that the movement of the bar B rotates the sleeve F. The projecting pin F$^2$ of the forked arm F' of the sleeve F is engaged in the left upper part of the groove $b$ in the bar B and prevents the sleeve F from turning during the unlocking of the breech-plug E.

The breech-plug may be of any suitable form that will swing out clear of the gun after being unlocked without requiring any or only a slight longitudinal movement to the rear.

The action in opening the breech is as follows: On swinging the lever C away from the gun the sliding bar B is moved some distance horizontally toward the pivot G' of the carrier A. The movement of the bar B causes the pinion D to move the pin D$^3$ of the actuating-lever D² in the notch E' in the rear flange of the breech-plug E, thus causing the plug E to turn. The groove E' in the face of the plug is of such a form that the movement of the pin D³ in it causes the breech-plug E to turn it first slowly and then more rapidly until it becomes unlocked. The sleeve F, which has been held in position (while the breech-plug E has been unlocked) by means of the pin F², engaged in the groove of the bar B, is now free to turn, and by the continued movement of the bar B the projecting pin B² of the bar B engages the forked arm F' of the sleeve F, thereby turning it. This causes the breech-plug E to move longitudinally rearward by means of the projecting studs F³ and F⁴ working in the grooves E³ and E² in the bore of the breech-plug E at first slowly and then more rapidly, owing to the increasing incline of these grooves, which at first is practically nil. A pin E⁴ projects from the rear face of the plug E into a hole in the carrier A as soon as the plug E commences to move to the rear, thus preventing the plug E from turning while the carrier is being moved to the rear or taken forward in the reverse action. By continuing to swing the lever C away from the gun the carrier A is swung out, thus withdrawing the plug E out of the breech of the gun and away from it. As the carrier A recedes from the breech-face of the gun a spring-catch H (the end of which was bearing against the breech-face of the gun) is liberated and enters between the teeth in the bar B, preventing any further movement of the bar B when swinging the breech-plug in or out of the gun. By swinging the lever C toward the gun the breech-plug E is first introduced into the breech G. The catch H is released when the carrier A is up against the breech-face of the gun and the bar B is free to move, and the bar B is then moved away from the pivot G', at first turning the sleeve F, and thereby moving the breech-plug E a short distance longitudinally forward until the pin E⁴ is clear of the hole in the carrier A. The bar is now disengaged from the sleeve F, and the actuating-lever stud D³ has now entered the groove in the face of the breech-plug E, and the continued movement of the bar B turns the plug E until it is locked. The position of the stud D³ on the actuating-lever D² is arranged to pass the dead-center after the breech-plug is locked to form a locking arrangement, so that the breech-plug cannot become unlocked when the gun is fired.

In order to hold the carrier A against the face of the gun when unlocking and drawing back the plug, a bolt K is engaged in a hole in a bracket projecting from the breech of the gun. The stem of this bolt has an arm engaged in the groove b of the sliding bar B. In this groove there is an inclined part, which, when the sliding bar has moved so far as to unlock and draw back the breech-plug, draws up the bolt K, leaving the carrier free to be swung back from the breech.

Figs. 5, 6, and 7 show the breech mechanism with a worm-gear to be used in large guns instead of the hand-lever for moving the plug-carrier. In this arrangement the worm-wheel W is fixed to an arm W', having a slot in which the pin B' of the sliding bar B works, as above described. The worm which gears with the worm-wheel is rotated by the hand-wheel W².

Figs. 8, 9, and 10 show the modification of the breech mechanism adapted for guns charged with cartridges. In this arrangement the breech-plug is of any suitable form that will swing out clear of the gun after being unlocked without requiring any longitudinal movement to the rear, and consequently the sleeve F is dispensed with.

Having thus described the nature of our invention and the best means we know of carrying the same into practical effect, we claim—

1. In combination with the breech-plug of a gun, a carrier and an actuating-lever therefor, a rack-bar slidably mounted in the carrier and having a slotted connection with the lever, a pinion journaled in the carrier and meshing with the rack-bar, a crank-arm carried by the journal of said pinion and having at its free end a roller and a notch formed in the flange of the breech-plug and adapted to receive the roller, substantially as described.

2. In combination with the breech-plug of a gun, a carrier and an actuating-lever therefor, a rack-bar slidably mounted in the carrier and having a slotted connection with the lever, a pinion journaled in the carrier and meshing with the rack-bar, a crank-arm carried by the journal of said pinion and having at its free end a roller, a notch formed in the flange of the breech-plug and adapted to receive the roller, and a spring-catch operating to engage the teeth of the rack-bar, to prevent further movement of the same, when the breech-plug has been turned to an unlocked position, substantially as described.

3. In combination with the breech-plug of a gun, a carrier and an actuating-lever therefor, a bar, slidably mounted in the carrier, having a slotted connection with the lever and having a stud at its free end, means operated by the bar to unlock the breech-plug, and means for imparting a slight longitudinal movement to the breech-plug before swinging the same bodily from the breech, comprising a recess formed in the breech-plug having spiral grooves therein, a boss on the carrier projecting into the recess and having exterior threads, a sleeve carried by the boss having interior threads engaging the threads of the boss, studs on said sleeve adapted to work in said spiral grooves and an arm carried by the sleeve adapted to be engaged by the stud on the rack-bar, substantially as described.

4. In combination with the breech-plug of a gun, a carrier and an actuating-lever therefor, a bar, slidably mounted in the carrier, having a slotted connection with the lever and having a longitudinal groove therein, means operated by the bar to unlock the breech-plug, means for imparting a slight longitudinal movement to the breech-plug before swinging the same bodily from the breech, comprising a recess formed in the breech-plug having spiral grooves therein, a boss on the carrier projecting into the recess and having exterior threads, a sleeve carried by the boss having interior threads engaging the threads of the boss, studs on said sleeve adapted to work in said spiral grooves, and means for preventing such longitudinal movement while unlocking the breech-plug comprising an arm carried by the sleeve having a pin adapted to work in the groove of the bar, substantially as described.

5. In combination with the breech-plug of a gun, a carrier and an actuating-lever therefor, a bar, slidably mounted in the carrier, having a slotted connection with the lever, means operated by the bar to unlock the breech-plug, means for imparting a slight longitudinal movement to the breech-plug before swinging the same bodily from the breech, and means for preventing the turning of the breech-plug during its movement to and from the breech comprising a hole formed in the carrier and a pin carried by the breech-plug and adapted to be projected into said hole in the longitudinal movement of the breech-plug, substantially as described.

6. In combination with the breech-plug of a gun, a carrier and an actuating-lever therefor, a bar, slidably mounted in the carrier, having a slotted connection with the lever and having a longitudinal groove therein, and a stud at its free end, means operated by the bar to unlock the breech-plug, a recess formed in the breech-plug having spiral grooves therein, a boss on the carrier projecting into the recess and having exterior threads, a sleeve carried by the boss having interior threads engaging the threads of the boss, studs on said sleeve adapted to work in said spiral grooves, and arms carried by the sleeve one of which has a pin working in the groove in the bar, and both of which are adapted to be engaged by the stud on the bar, substantially as described.

7. In combination with the breech-plug of a gun, a carrier and an actuating-lever therefor, a bar, slidably mounted in the carrier, having a slotted connection with the lever and having a longitudinal groove therein with an inclined portion, a stud at the free end of said bar, means operated by the bar to unlock the breech-plug, a recess formed in the breech-plug having spiral grooves therein, a boss on the carrier projecting into the recess and having exterior threads, a sleeve carried by the boss having interior threads engaging the threads of the boss, studs on said sleeve adapted to work in said spiral grooves, arms carried by the sleeve one of which has a pin working in the upper plane of the groove in the bar and both of which are adapted to be engaged by the stud on the bar, a bracket on the breech of the gun having a bolt-hole therein, a bolt carried by the carrier adapted to be locked in said hole and an arm on said bolt adapted to work in the groove in the bar, substantially as described.

8. In combination with the breech-plug of a gun, a carrier and an actuating-lever therefor, a rack-bar, slidably mounted in the carrier, having a slotted connection with the lever and having a longitudinal groove therein with an inclined portion, a stud at the free end of said bar, a pinion journaled in the carrier and meshing with the rack-bar, a crank-arm carried by the journal of said pinion and having at its free end a roller, a notch formed in the flange of the breech-plug and adapted to receive the roller, a spring-catch operating to engage the teeth of the rack-bar, a hole formed in the carrier, a pin carried by the breech-plug adapted to engage in said hole, a recess formed in the breech-plug having spiral grooves, a boss on the carrier projecting into the recess and having exterior threads, a sleeve carried by the boss having interior threads engaging the threads of the boss, studs on said sleeve adapted to work in said spiral grooves, an arm on said sleeve adapted to be engaged by the stud on the rack-bar, a second arm on said sleeve having a pin working in the upper plane of the groove in the rack-bar, a bracket on the breech of the gun having a bolt-hole, a bolt carried by the carrier adapted to be locked in said bolt-hole, and an arm on said bolt adapted to work in the groove in the rack-bar, substantially as described.

In testimony whereof we have signed our names to this specification, in the presence of two subscribing witnesses, this 14th day of July, A. D. 1897.

ARTHUR TREVOR DAWSON.
GEORGE THOMAS BUCKHAM.

Witnesses:
ARTHUR EDWARD MASCALL,
WALTER HODGES REYNER.